Patented Aug. 8, 1933

1,921,760

UNITED STATES PATENT OFFICE 1,921,760

ALLOY

Robert H. Leach, Fairfield, Conn., assignor to Handy & Harman, New York, N. Y., a Corporation of New York No Drawing. Application June 23, 1933
Serial No. 677,272

4 Claims. (Cl. 75—1)

This invention relates to alloys and is concerned more particularly with a new alloy for use in soldering and brazing. The alloy of this invention has the strength, ductility, and malleability required for such purposes and has relatively low melting and flow points. In addition, it is resistant to tarnish so that it may be used to especial advantage in soldering and brazing articles made of tarnish-resistant silver alloys.

In the last few years, a number of silver alloys have been developed which are more resistant to tarnish than alloys of a similar silver content in which copper is used as the alloying metal. In soldering objects made of such tarnish-resistant alloys, it has been found that ordinary silver solders containing copper cannot be used satisfactorily, since the solder itself tarnishes more rapidly than the objects because of the presence of the copper. It is, therefore, necessary to employ a tarnish-resistant solder in order to obtain all the advantages of the tarnish-resistant alloys, and the present invention is directed to the provision of a soldering or brazing alloy which has the desired resistance to tarnish and suitable physical and thermal properties for those uses.

It has been the practice heretofore in making tarnish-resistant silver alloys to employ zinc, cadmium, or tin as the alloying metals, and it is well known that the addition of these metals to silver produces an alloy of lower melting point than silver. But as the amount of these alloying ingredients is increased, the resulting alloy increases in brittleness until a point is reached when the alloy is no longer useful. I have found, however, that if the proper ingredients are employed and the amounts thereof are kept within certain definite ranges which I have discovered, an alloy is produced which has melting and flow points sufficiently low so that it may be used satisfactorily as a solder, which is resistant to tarnish, and which has sufficient ductility, malleability, and strength for the purposes mentioned.

My experiments in the field have established that a brazing and welding alloy of the desired characteristics may be made by combining silver, zinc, and cadmium, provided the silver lies within a range of from about 50% to about 80%, the zinc ranges from about 15% to about 35%, and the cadmium ranges from about 1% to about 15%.

Typical examples of the new brazing and soldering alloy may have the following approximate compositions:

Example No. 1

| | |
|---|---|
| Silver | 75% |
| Zinc | 24% |
| Cadmium | 1% |

Example No. 2

| | |
|---|---|
| Silver | 70% |
| Zinc | 25% |
| Cadmium | 5% |

Example No. 3

| | |
|---|---|
| Silver | 50% |
| Zinc | 35% |
| Cadmium | 15% |

The alloy of Example No. 1 has a melting point of approximately 1300° F. and a flow point of 1340° F. The melting and flow points of the alloy given in Example No. 2 are respectively 1260° F. and 1320° F. and the melting and flow points of the alloy of Example No. 3 are respectively 1150° F. and 1190° F.

All the alloys containing the three ingredients within the specified ranges have a much greater resistance to tarnish than copper-silver alloys of similar thermal characteristics and the new alloys are strong, ductile, and malleable so that strong joints may be made with them.

What I claim:

1. A brazing and soldering alloy which consists of silver ranging from about 50% to about 80%, zinc ranging from about 15% to about 35%, and cadmium ranging from about 1% to about 15%.

2. An alloy for brazing and soldering purposes which contains about 75% silver, about 24% zinc, and about 1% of cadmium.

3. An alloy for brazing and soldering purposes which contains about 70% silver, about 25% zinc, and about 5% cadmium.

4. An alloy for brazing and soldering purposes which contains about 50% silver, about 35% zinc, and about 15% cadmium.

ROBERT H. LEACH.